United States Patent [19]

Yamagishi et al.

[11] Patent Number: 5,390,218
[45] Date of Patent: Feb. 14, 1995

[54] PROCESS FOR PREPARING A FUEL PELLET FOR NUCLEAR REACTOR

[75] Inventors: Shigeru Yamagishi; Yoshihisa Takahashi, both of Tokai, Japan

[73] Assignee: Japan Atomic Energy Research Institute, Tokyo, Japan

[21] Appl. No.: 147,297

[22] Filed: Nov. 5, 1993

Related U.S. Application Data

[63] Continuation of Ser. No. 842,983, Feb. 28, 1992, abandoned.

[30] Foreign Application Priority Data

Apr. 10, 1991 [JP] Japan .................................. 3-164056

[51] Int. Cl.$^6$ .............................................. G21C 21/00
[52] U.S. Cl. .................................... 376/261; 376/421; 252/634; 264/0.5
[58] Field of Search ............... 376/261, 421, 422, 901; 976/DIG. 96, DIG. 95, DIG. 93; 264/0.5; 252/638, 636, 635, 634; 423/261, 251, 252, 253

[56] References Cited

U.S. PATENT DOCUMENTS

4,073,834  2/1978  Mysels ................................. 376/901
4,571,315  2/1986  Gerontopoulos et al. .......... 264/0.5

Primary Examiner—Daniel D. Wasil
Attorney, Agent, or Firm—Oblon, Spivak, McClelland, Maier & Neustadt

[57] ABSTRACT

A process of preparing a fuel pellet for a nuclear reactor, comprising washing the gel particle using an organic solvent miscible with water to substitute the organic solvent for the water, removing the organic solvent, moistening again the dry gel particle, followed by press molding and sintering.

5 Claims, No Drawings

PROCESS FOR PREPARING A FUEL PELLET FOR NUCLEAR REACTOR

This is a continuation, of application Ser. No. 07/842,983, filed on Feb. 28, 1992, now abandoned.

BACKGROUND OF THE INVENTION (a) Field of the Invention

The present invention relates to a process for preparing a fuel pellet for nuclear reactor.

(b) Description of the Prior Art

The prior main process for preparing a fuel pellet for nuclear reactor is to make a powder of oxide, carbide or nitride having the same chemical form as the fuel by any means and press mold the power and sinter it. In this case, the contamination of manufacturing institution by finely divided powder is a problem because of handling powder. In particular, in case of handling plutonium, or in case of handling a recycling fuel in thorium cycle, as a substitute method for avoiding the handling of powder, pellet manufacturing method by the above described "gel particle pressing method" which is called "Sphere-Cal" [Literature 1, see below], "COGEPEL" (COnversion using GElation to produce PELlets) [Literature 2] or "SGMP" (Sol-Gel Microsphere Pellatization) [Literature 3], using a gel particle manufactured by a sol-gel method developed in the field of manufacturing of high-temperature gas-cooled reactor fuel spherepac fuel as a pressing raw material has been researched.

In case of uranium dioxide or a mixed oxide containing uranium as a base, a high density of pellet as 95% T.D. was obtained by 1982 [Literature 2]. Herein, % T.D. is relative density for theoretical density.

On the other hand, in case of thorium oxide or a mixed oxide containing thorium as a base, a high density of pellet was not obtained in that time because a dry gel particle obtained by the sol-gel method is in the glass state, hard and wrong in press characteristics [Literature 1 and 4).

In case of this thorium-base oxide, a high density of pellet could not be obtained until the press characteristics has been improved in the joint work of Germany and Brasil (1979-1983), by mixing finely divided powder of carbon and poly vinylalcohol in the sol and making the particle soft by oxidatively removing carbon by high temperature heat treatment of gel particle (in this case, as a sintering aid, calcium was previously added in the sol.) [Literature 5]. Thereafter it has been published 1986 that this method is successful even in the condition of not using polyvinyl alcohol [Literature 3].

The above literatures are as shown in the following Table 1.

TABLE I

| | |
|---|---|
| Literature 1: | ORNL/TM-6906(1979) |
| Literature 2: | Trans. Am. Nucl. Soc., 40(1982)52-54 |
| Literature 3: | Nucl. Technol., 73(1986)84-95 |
| Literature 4: | J. Nucl. Mater., 92(1980)207-216 |
| Literature 5: | JUL-SPEZ-266(1984)86-121 |
| Literature 6: | J. Nucl. Sci. Technol., 25(1988)848-856 |

SUMMARY OF THE INVENTION

An object of the present invention is to provide a process by which a high density of sintered pellet of thorium oxide or a mixed oxide containing thorium as a base can be prepared without adding a sintering aid by developing a method of obtaining an easily press moldable soft gel particle without using an additive and a method of elevating a lubrication effect for further improving a press moldability.

DESCRIPTION OF THE PREFERRED EMBODIMENT

As the result of applying himself to research for attaining this object, the present inventor has found that, as a method of obtaining a easily press moldable soft dry gel particle, that one can prevent the gel particle becoming a particle in the hard glass state by sufficiently washing the gel particle using an organic solvent miscible with water such as alcohol to substitute water therewith and thereafter removing the organ ic solvent used, and that the press moldability can be improved by moistening again the dry heat treated gel, and has invented the present invention based on this knowledge.

According to the drying method of the present invention, a low density of soft gel particle as below 29% T.D. can be obtained while the density of dry gel particle obtained by the prior drying method is about 35% T.D.

And, according to the method of the present invention in which a dry gel particle is moistened again before press molding, the water content in the moistened gel particle plays the part of lubricant which is added for the purpose of fluidity and adhesive in case of ordinary powder molding, and further plays a part of caking agent, and the moldability can be improved.

The present invention will be further explained with Examples by which the present invention is not limited.

EXAMPLE 1

[Preparation and gelation of nuclear fuel sol]

A sol of 1.0 mol/l in thorium concentration was prepared by a method described in Literature 6 in which ammonia gas is added to a heated aqueous solution of thorium nitrate to obtain a sol of colloidal thorium oxide. This sol was divided into droplets of 0.3 mm in diameter using a vibration nozzle in air and was gellated in ammonia gas and continuously in ammonia water to obtain microspherical gel particles in which ammonium nitrate contained was washed out with dilute ammonia water.

[Drying of gel particle]

The water content in the gel particle was substituted with isopropyl alcohol to below 1 wt. % of balance water content concentration in isopropyl alcohol and then the gel particle was separated from isopropyl alcohol. And, after removing most of isopropyl alcohol by vacuum vaporization, the gel particle was dried in air of 80° C. The water content in gel particle in this stage was 10% by weight. This particle was heated in air in 450° C. for 3 hours to make the water content about 0%. The density of this particle was about 29% T.D. This dry particle was used as a raw material for press moldability.

[Moistening of particle - Press molding - Sintering]

The particles once dried were moistened to each value described in Table 2 (density of thorium oxide pellet -unit : T.D. ) using a thermo-hygrostat.

TABLE 2

| Pressure (MPa) | Water content of moisture added (Wt %) | | | |
|---|---|---|---|---|
| | 0 | 5 | 10~12 | 15~16 |
| 150 | 29.4 | | 33.5 | 33.7 |

5,390,218

TABLE 2-continued

| Pressure (MPa) | Water content of moisture added (Wt %) | | | |
|---|---|---|---|---|
| | 0 | 5 | 10~12 | 15~16 |
| 200 | 84.6 / 32.5 | | 94.1 / 38.7 | 93.8 |
| 300 | 90.1 / 37.6 | [43.4]*2 | 96.8 / 42.1 | 39.2 |
| 400 | [94.9]*1 | [97.6]*2 | 96.7 / 42.1 | 96.0 / 98.6 |
| 500 | [45.8]*2 / [97.8]*2 | | 43.4 / 98.6 | |

*1: For comparison the weight of water content of moisture added was left out of account in the calculation of green density.
*2: [ ] shows one cracked.

The die used for the press mold is 7 or 10 mm in diameter and slightly tapered for easily drawing out therefrom. An alcohol solution of stearic acid was used as a lubricant for dies.

It was press molded within the range of 0~15-16% in water content added for moistening and the range of 150-500 MPa. This green density is shown in the upper column of Table 2. This green pellet was heated to 500° C. in moistened air and then to 1300° C. in air and, after keeping for 3 hours, was cooled. The density of sintered pellet so obtained is shown in the lower column of Table 2.

EXAMPLE 2

A dry gel particle of about 25% T.D. in density and 3% in remained water content was prepared according to the same method as Example 1 exept using uranium for 10% of thorium. This particle was moistened to about 15% water content and press molded under 300 MPa. This green pellet was 40% T.D. in density. After sintering under the same condition as Example 1, it was reduced in a mixed gas of argon and hydrogen at 1300° C. to obtain a pellet of mixed thorium and uraniumm oxides ($Th_{0.9}U_{0.1}O_2$) of 97% T.D. in density.

The dry gel particle obtained by the process of the present invention is not only low in density and soft but also is so excellent in sinterability that it can be sintered to a high density of particle even in case of sintering as it is. Therefore, even a low density of green pellet as below 40% T.D. press molded under a low pressure as 300 MPa is so effective that it can be sintered to a high density of pellet as above 95% T.D. at a low temperature as 1300° C. And it is effective that it can be press molded to a high density of pellet, comparing with the case of 0% in water content under the same pressure, even without adding an additive, according to the process of the present invention in which, after moistening again a dry gel particle to a water content of about 10-15%, it is press molded (refer to the case of below 300 MPa in Table 2).

And the water content of moisture plays a part of caking agent which prevents the occurrence of crack on mold.

In Table 2, a remarkable effect is recognized in case of 300 MPa and 500 MPa. Even in low pressure in which such effect is low finally a high density of sintered pellet can be obtained.

What is claimed is:

1. In the process of preparing a fuel pellet for a nuclear reactor containing one or more nuclear fuel materials selected from the group consisting of thorium, uranium and plutonium by press molding microspherical particles of the fuel materials into a cylindrical pellet and thereafter by sintering the pellet, the steps which comprise gelating either small spheres of an aqueous sol having dispersed in the sol the nuclear fuel material in the form of colloidal oxide particles or small spheres of a mixed aqueous solution of a nuclear material and organic material to obtain moist microspherical gel particles, thereafter substituting water in the moist microspherical gel particles with an organic solvent miscible with water to obtain gel particles moistened with a solution of less than 1% water concentration in the organic solvent, thereafter removing the organic solvent in the microspherical gel particles by applying at least one of a vacuum treatment or heating to the microspherical gel particles, and thereafter further heat treating the microspherical gel particles to remove water content which was not substituted with the organic solvent.

2. The process as set forth in claim 1 in which said organic solvent is alcohol.

3. The process as set forth in claim 1 wherein said microspherical gel particles are prepared from an aqueous sol, characterized by gelating the sol without adding any additive and thereafter only moistening the microspherical gel particles after drying and then press molding them.

4. The process as set forth in claim 1 in which the fuel is thorium oxide or a mixed oxide of uranium and/or plutonium containing thorium as a base.

5. The process as set forth in claim 2 in which the alcohol is isopropyl alcohol.

* * * * *